(12) United States Patent
Prasad et al.

(10) Patent No.: US 9,042,824 B2
(45) Date of Patent: May 26, 2015

(54) CONTEXT ADAPTIVE CONTENT INTERACTION PLATFORM FOR USE WITH A NOMADIC DEVICE

(75) Inventors: Krishnaswamy Venkatesh Prasad, Ann Arbor, MI (US); Christopher Peplin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 13/604,970

(22) Filed: Sep. 6, 2012

(65) Prior Publication Data

US 2014/0065965 A1 Mar. 6, 2014

(51) Int. Cl.
*H04B 7/00* (2006.01)
*B60W 10/00* (2006.01)
*G07C 5/00* (2006.01)

(52) U.S. Cl.
CPC ............... *B60W 10/00* (2013.01); *G07C 5/008* (2013.01)

(58) Field of Classification Search
USPC ......... 455/41.2, 41.3, 423–425, 67.11, 67.13, 455/68, 69, 556.1, 556.2, 557, 569.1, 569.2, 455/95, 99, 11.1, 13.1, 552.1, 553.1; 340/539.1, 539.13, 539.22–539.29
See application file for complete search history.

(56) References Cited

U.S. PATENT DOCUMENTS

| | | | |
|---|---|---|---|
| 6,825,758 B1 * | 11/2004 | Laitsaari | 340/442 |
| 7,409,275 B2 * | 8/2008 | Sakurai et al. | 701/29.1 |
| 7,737,829 B2 * | 6/2010 | Nishiyama | 340/425.5 |
| 7,756,602 B2 | 7/2010 | Koempel et al. | |
| 7,831,433 B1 | 11/2010 | Belvin et al. | |
| 8,136,138 B2 * | 3/2012 | Jira et al. | 725/75 |
| 8,583,317 B2 * | 11/2013 | Nishida | 701/31.4 |
| 2003/0063756 A1 | 4/2003 | Geerlings et al. | |
| 2005/0148376 A1 | 7/2005 | Kucera | |
| 2006/0154713 A1 | 7/2006 | Sunazuka et al. | |
| 2007/0097832 A1 | 5/2007 | Koivisto et al. | |
| 2007/0143798 A1 * | 6/2007 | Jira et al. | 725/62 |
| 2008/0039204 A1 | 2/2008 | Ackley et al. | |
| 2009/0113346 A1 | 4/2009 | Wickramasuriya et al. | |
| 2009/0254241 A1 * | 10/2009 | Basir | 701/33 |
| 2010/0053069 A1 | 3/2010 | Tricoukes et al. | |
| 2010/0214133 A1 | 8/2010 | Becker | |
| 2010/0293033 A1 | 11/2010 | Hall et al. | |
| 2010/0311345 A1 | 12/2010 | Santori et al. | |
| 2011/0081967 A1 | 4/2011 | Butcher et al. | |
| 2011/0143668 A1 * | 6/2011 | Farrell et al. | 455/41.2 |
| 2013/0005302 A1 * | 1/2013 | Ozaki | 455/411 |

OTHER PUBLICATIONS

Ford, Lincoln, Mercury, Powered by Microsoft, SYNC Handbook, Quick Access to Frequently Used Features and Services.
Ford Motor Company, User Manual, Rear Seat DVD Entertainment System, Apr. 2002.
Ford Motor Company, Lincoln, SYNC with MyFord Touch (Trademark)/MyLincoln Touch (Trademark), Quick Reference Guide.
SYNC, Powered by Microsoft, Supplemental Guide.

* cited by examiner

*Primary Examiner* — Tuan A Tran
(74) *Attorney, Agent, or Firm* — Jennifer M. Stec; Brooks Kushman P.C.

(57) ABSTRACT

A vehicle computer system comprising a transceiver in a vehicle configured to wirelessly connect with a nomadic device, wherein the nomadic device is capable of running a contextual application which operates at least in part based on vehicle environment data. The vehicle computer system further comprises one or more vehicle modules configured to receive environment data and capable of causing the transceiver to provide the vehicle environment data to the nomadic device for processing by the contextual application.

20 Claims, 3 Drawing Sheets

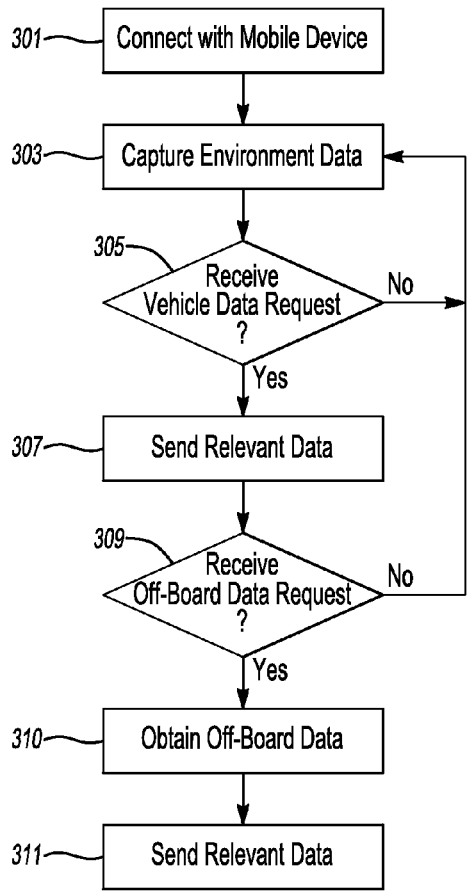
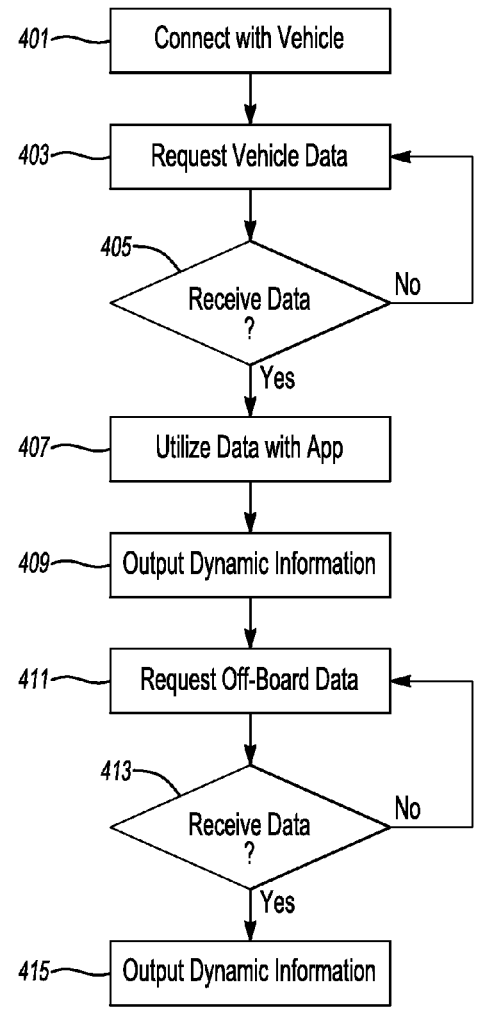
Fig-3    Fig-4
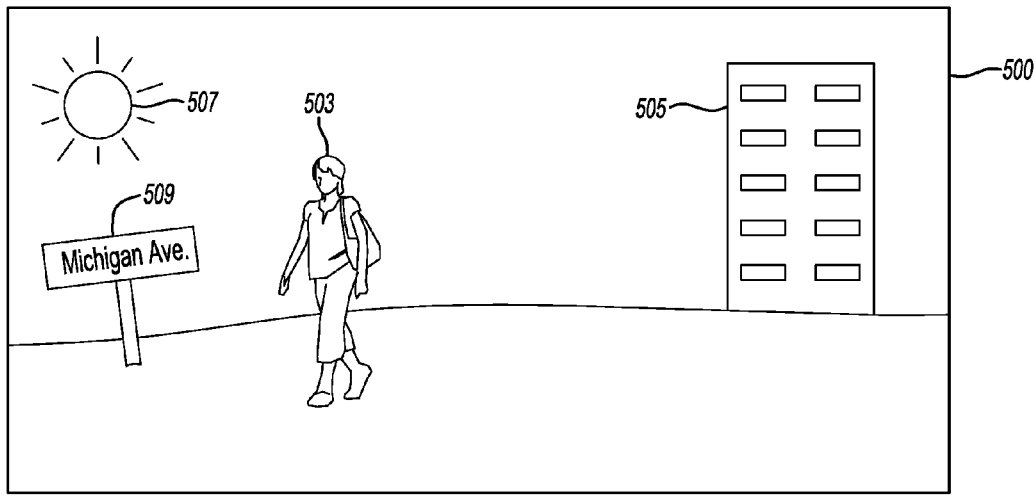
Fig-5

CONTEXT ADAPTIVE CONTENT INTERACTION PLATFORM FOR USE WITH A NOMADIC DEVICE

TECHNICAL FIELD

The illustrative embodiments generally relate to context adaptive content interaction platforms for use with nomadic devices.

BACKGROUND

Below, a few prior art entertainment systems are described. Additional usage of these systems may be obtained and described from the identified references below.

U.S. Patent Application No. 2010/0311345 illustrates a computer-implemented method and system for operating a computer application stored on a nomadic wireless communication device (ND) located within the vicinity of a vehicle. An input may be received at a vehicle computer system (VCS) to pair the VCS with the ND for establishing a wireless communication link. A number of instructions may be received at the VCS from the ND over the wireless communication link. The instructions may include instructions for establishing a connection with an internet radio application and instructions for prompting a user for one or more internet radio application events. A request from the user for the one or more internet radio application events may be received at the VCS and the one or more internet radio application events may be executed.

U.S. Pat. No. 7,756,602 illustrates an entertainment system for a vehicle that includes a vehicle environment sensor apparatus that captures data indicative of the vehicle's environment and that generates a vehicle environment data feed. A video game console is electronically coupled to the vehicle environment sensor apparatus and has an application program interface. The video game console receives the vehicle environment data feed, operates a game medium, and generates a video output signal based on both the game medium and the vehicle environment data feed. At least one controller is communicatively coupled to the video game console and directs the operation of the game medium. A display unit communicatively coupled with the application program interface receives the video output signal and displays images dependent upon the video output signal.

US Patent Application No. 2011/00819674 illustrates an interactive media social game. In embodiments, a social game service administrates a networked social game based on media asset interactions. Media asset interaction data is received that identifies media assets when they are downloaded or played at a user device. The media assets are correlated with a social game entity, such as a music pet that is a token entity of the networked social game. The music pet adaptively changes according to characteristics of the media assets. The media asset interaction data is also compiled as a media asset selection history corresponding to a user that is associated with the user device. A media asset recommendation for the user can be generated based on the media asset selection history, and the media asset recommendation is communicated as a recommendation message from the music pet to the user that is associated with the user device.

US Patent Application No. 2009/0113346 depicts a method and apparatus whereby the context of user activity can be used to tailor the ambient information system. The method and apparatus use both short-term context such as recent activity and long-term context such as historical patterns to highlight specific content on channels or widgets that are likely to be of most immediate interest to the user. This contextual information provided by the framework can also be used to make intelligent decisions about how to tailor the user experience after a user has interacted with the item in question. Additionally, context information accumulated on one device such as a mobile phone can be broadcasted to other devices to influence the ambient information display application on a second device such as a desktop based on enabling remote access to the local context repository.

SUMMARY

A first illustrative embodiment describes a non-transitory computer readable storage media storing instructions that, when executed by one or more processors in a vehicle, causes the processor to connect a vehicle transceiver with a nomadic device configured to operate a contextual application, collect environment data from at least one vehicle module, wherein the environment data is capable of being used by the contextual application of the nomadic device to generate output, receive a request from the nomadic device for the environment data, and send the environment data to the nomadic device in response to the request.

A second illustrative embodiment describes a vehicle computer system comprising a transceiver in a vehicle configured to wirelessly connect with a nomadic device, wherein the nomadic device is capable of running a contextual application which operates at least in part based on vehicle environment data. The vehicle computer system also includes one or more vehicle modules configured to receive environment data and capable of causing the transceiver to provide the vehicle environment data to the nomadic device for processing by the contextual application.

A third illustrative embodiment describes a method of providing a contextual application on a nomadic device. The method includes connecting with a computer system, wherein the computer system is configured to collect environment data for utilization with the contextual application. The method also includes sending a request to the computer system, wherein the request includes a message to receive environment data. The method further includes receiving the environment data from the computer system, aggregating the environment data with the contextual application to generate dynamic content and outputting the dynamic content on the nomadic device using the contextual application.

BRIEF DESCRIPTION OF THE DRAWINGS

FIG. 3 depicts an illustrative flow chart of a vehicle based computing system interacting with a nomadic device.

FIG. 4 depicts an illustrative flow chart of a nomadic device interacting with a vehicle based computing system.

FIG. 5 depicts an illustrative screen of an application outputting dynamic content through utilization of the environment data.

DETAILED DESCRIPTION

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

The processes described illustratively herein can be implemented as computer code stored on a machine readable storage medium and executed by a processor. Storage medium include, but are not limited to, HDD, CDs, DVDs, RAM, ROM, flash drives, or any other suitable storage medium.

Figure 1:
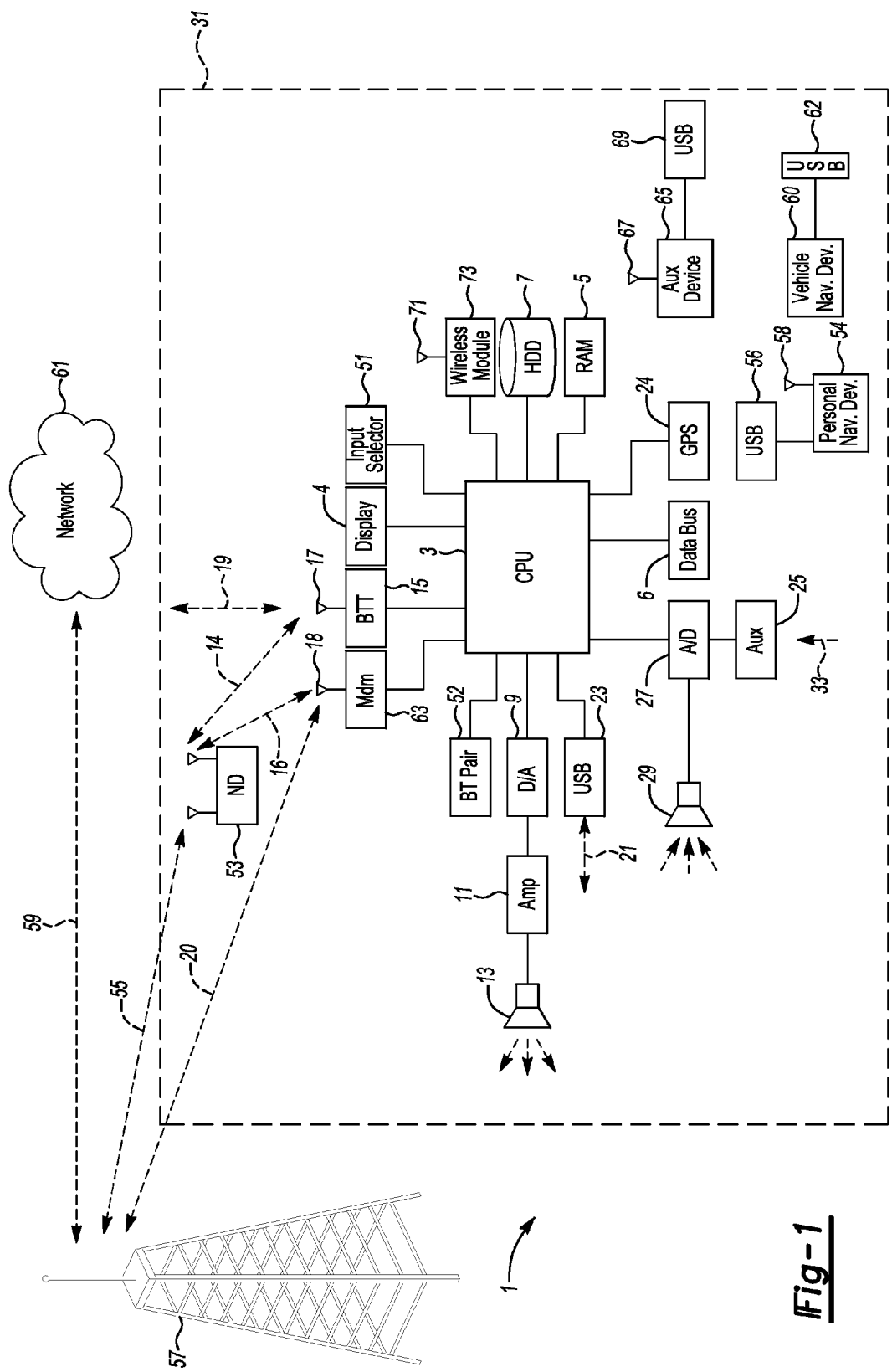
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Numerous of the vehicle components and auxiliary components in communication with the VCS may use a vehicle network 6 (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Figure 2:
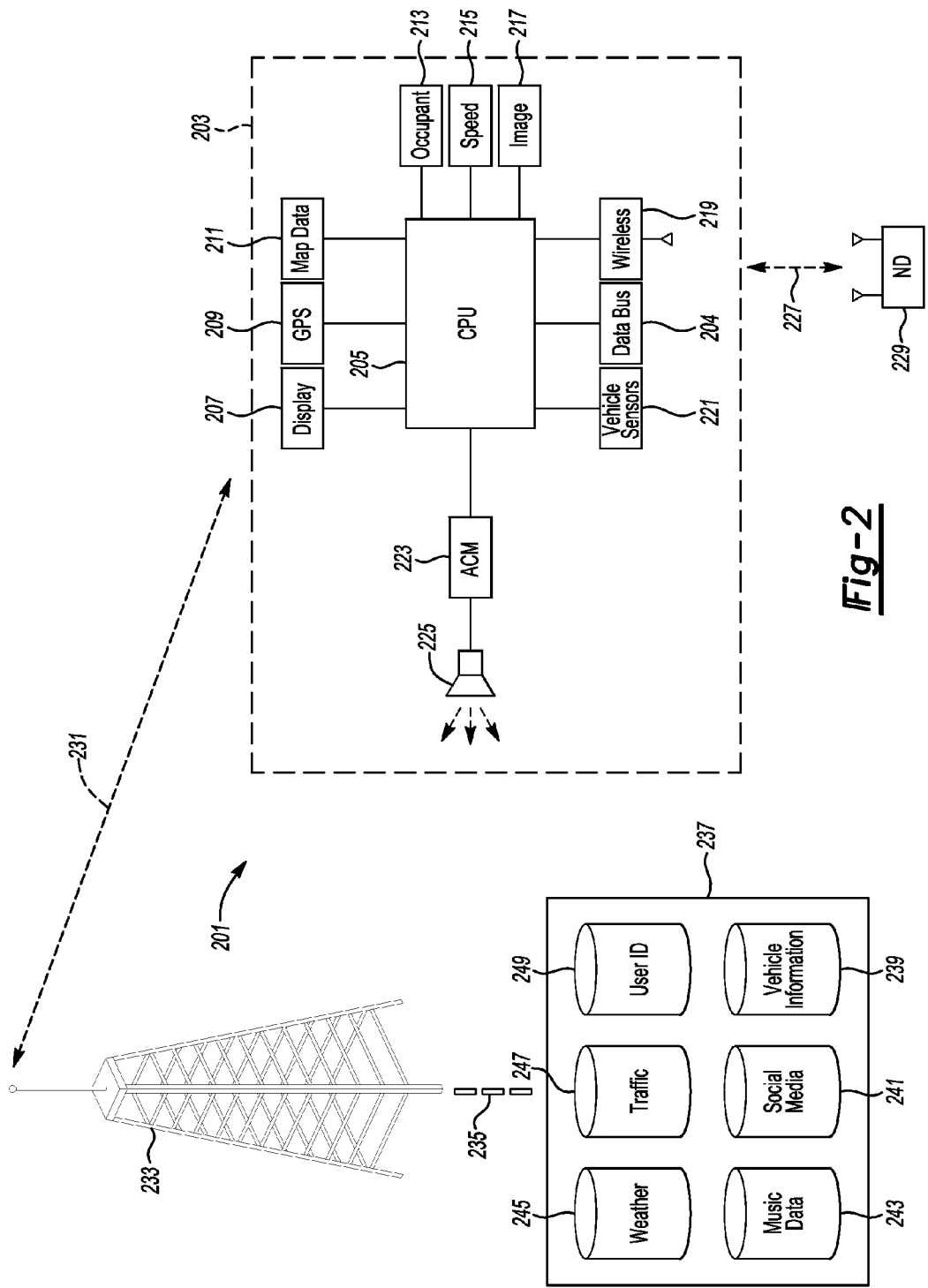
FIG. 2 illustrates another example of a block topology for a vehicle based computing system for a vehicle which interacts with a nomadic device.

FIG. 2 illustrates an example of a block topology for a vehicle based computing system for a vehicle which interacts with a nomadic device. An example of such a vehicle-based computing system 201 is the SYNC system manufactured by THE FORD MOTOR COMPANY. A vehicle enabled with a vehicle-based computing system may contain a visual front end interface located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

The vehicle 203 may incorporate a specific type of vehicle computing system to interact with a nomadic device 229. In an illustrative embodiment, the nomadic device 229 may be a portable wireless device enabled with different gaming applications. Some illustrative examples of a nomadic device include, but are not limited to, a tablet (iPAD, PLAYBOOK, LEAPFROG LEAPPAD, etc.), a portable computer, MP3 player (e.g. IPOD, IPOD TOUCH), cellular phone, smart phone, portable video game system (e.g. SONY PLAYSTATION, NINTENDO DS, etc.), etc. The nomadic device may be in communication with the VCS through both wireless 227 or a wired connection. In one illustrative example, transceivers and/or transmitters on the nomadic device 229 may be used to communicate with a vehicle's wireless transceiver 219. The wireless transceiver 219 may be a Bluetooth transceiver, WiFi transceiver, RF transceiver, etc.

The vehicle 203 may utilize the vehicle computing system 201 to gather, collect, and/or aggregate data. The data may be sent to the nomadic device 229 for utilization with an application. For example, the CPU 205 may be connected to or in communication with various modules, processors, or data such as, but not limited to, a display 207, a GPS receiver 209, map data 211, vehicle occupant sensors 213, speed sensor 215, vehicle image sensors 217, radio 223, speaker 225 and other vehicle sensors 221 (e.g. gyroscope, yaw sensor, park aid system, collision warning, clock, etc.). In yet another illustrative example, vehicle sensors or modules may monitor data regarding air quality, temperature, air pressure, fuel economy, tire pressure, and the status of vehicle components, e.g. door locks, wipers, seat/occupant detection, etc. The connection between the CPU 205 and the various modules may be a direct connection or an indirect connection with another module. Numerous other vehicle components and auxiliary components in communication with the VCS may use a vehicle network 204 (such as, but not limited to, a CAN bus) to pass data to and from the VCS (or components thereof).

Each sensor, module, processor, or server which communicates with the CPU 205 may collect and/or aggregate their own data. The data may be utilized for multiple use cases in conjunction with the nomadic device 229. In one illustrative example, the GPS receiver 209, may provide location based information, such as, but not limited to, coordinates, heading direction, etc., to the CPU 205. The CPU 205 may then send the GPS location data via the wireless transceiver 219 through a wireless communication link 227 to the nomadic device 229. The nomadic device 229 may utilize the GPS data on an application to dynamically render the orientation and location used in an application. For example, if an application that utilizes "The Wheels on the Bus" is aware of the GPS data on the vehicle, it may dynamically update the location of the application's bus based on the vehicle's GPS data. The application's bus may be heading in the same direction and as the vehicle. The application may also utilize data from the vehicle speed sensor to speed up/slow down the imaginary bus. The application may also utilize other vehicle data, such as but not limited to, yaw sensor, gyroscope, and map data, to further dynamically render the bus's application. For example, if a family is on a road trip near Niagara Falls, the bus that is rendered in the application may be shown in a similar setting as Niagara Falls or to utilize a game of "I SPY". On-board data may also be used to affect an applications control. In one illustrative example, the speed of a game, such as Tetris, may change based on the speed of the vehicle. In yet another illustrative embodiment, the vehicle may send data gathered from a gyroscope or yaw sensor to render a vehicle in a nomadic device's application going up a hill or making a turn.

Furthermore, the CPU 205 or nomadic device 229 may utilize a wireless connection 231 to communicate with a cellular tower 233 to establish communication 235 with an off-board server 237. The off-board server may aggregate data for utilization on the nomadic device. Some examples of the data collected by the server may include, but is not limited to, weather information 245, traffic data 247, user profile information 249, user music library 243, social media information 241, vehicle information 239, etc. The CPU 205 can then be used to communicate 235 with a server 237 outside the vehicle 203 through, for example, communication 231 with a cellular tower 233. The CPU 205 may then communicate 227 any data received from the server 237 with the nomadic device 229 via a transceiver 219.

In alternative embodiments, the nomadic device may be able to communicate directly with the server via a wireless connection. Rather than communicating through the VCS, the nomadic device may directly request the server to send the environment data. The server may provide various off-board data to the nomadic device directly through various wireless connections.

The off-board data on the server 237 may be utilized for impacting the environment of an application on a nomadic device 229. For example, the nomadic device may be equipped with an application which utilizes the weather data 245 to dynamically change the setting of the application based on the actual weather. For example, if it is snowing outside, the weather data 245 may be utilized to change the environment of the application to be located in snowy weather. The type of weather may also affect the feel of an application's controls based on the weather. For example, a video games character may slide around the video games environment if data indicates that there are icy conditions. Another illustrative example may render a nomadic device's application being located in congested traffic based on off-board traffic information. In yet another example, an off-board server may utilize data regarding air quality to monitor for pollution or allergen information FIG. 3 depicts an illustrative flow chart of a vehicle based computing system interacting with a nomadic device. The VCS may connect 301 with nomadic device through a wireless or wired communication link. In one illustrative example, both the nomadic device and VCS may utilize a Bluetooth wireless connection. The VCS may discover the nomadic device and identify the device utilizing the Bluetooth protocol. The VCS may require a registration and pairing process that implements security features to prevent unauthorized devices from communicating with the VCS.

The VCS may capture the environment data 303 by utilizing both on-board and off-board data. The VCS may have a multiplex data connection, such as high-speed or medium-speed CAN, to the modules. The VCS may be in direct or indirect communication with data collectors, such as sensors, modules, servers, etc. that are capable of capturing relevant data that may be utilized with a contextual based application. In one illustrative embodiment, the VCS may constantly request the data to be sent by the data collectors and store the data in memory. In another illustrative embodiment, the VCS may request the data from the data collectors after it receives a request from the nomadic device. For example, if a nomadic device is requesting to know the location of a vehicle, the nomadic device may send a request to the VCS to send map data, GPS data, altitude data etc. The VCS may then communicate with the GPS module and navigation system to receive the relevant data. The VCS may then store the data in memory or may send the data to the nomadic device.

The VCS may then be monitoring for a data request of on-board data from the nomadic device 305. The VCS may receive a message from the nomadic device identifying specific data which should be sent to the nomadic device for the application to use. The request may include various information, such as but not limited to, the data or message ID to be sent to the nomadic device, the application requesting the data, security information, nomadic device identification, etc. The message may also request data from a specific module or a group of modules. In one illustrative embodiment, the nomadic device may request only the vehicle speed data. In yet another illustrative embodiment, the nomadic device may request to receive all safety related data, which could include occupant data, vehicle speed data, and crash sensor data.

The VCS and the nomadic device may utilize an application program interface (API) or various schemas to allow applications to communicate with one another. The API may define the proper way for nomadic device to request different data. One illustrative example of an API is FORD MOTOR COMPANY'S APPLINK. Other illustrative examples could include the OPEN XC API. The VCS and the nomadic device may also utilize a dedicated protocol to allow communication of their respective applications. Middleware may also be utilized to interface different platforms or languages to interoperate.

The VCS may then send all or some of the requested data 307 to the nomadic device. The VCS may utilize both an API and the communication link to send the data to the nomadic device. The data that is transferred from the VCS to the nomadic device may or may not be utilized with the contextual application running on the VCS. In a scenario when the VCS may not have the requested data, the VCS may send an error message indicating that the requested data could not be sent. In the scenario when another error has occurred in sending the requested data, the VCS may send different type of error messages or data to notify the nomadic device that its request could not be fulfilled.

The VCS may then be monitoring for a data request of off-board data from the nomadic device 309. An off-board request may also include an on-board data request and vice versa. If no request for data is received by the VCS, the may wait to receive the request or constantly continue to capture environment data. The VCS may receive a message from the nomadic device identifying specific type of data which should be sent to the nomadic device for the application to use. The request may include various information or data, such as but not limited to, the data or message ID to be sent to the nomadic device, the application requesting the data, security information, nomadic device identification, etc. The message may also request data from a specific off-board server or a group of off-board servers. In one illustrative embodiment, the nomadic device may request only the vehicle traffic data. In yet another illustrative embodiment, the nomadic device may request to receive all geo-located related data, which could include traffic data, weather data, and point of interest information data.

After the VCS establishes communication with the off-board server, the VCS may obtain the off board data 310 from a variety of off-board servers. The VCS may analyze all of the data to determine which data is relevant to pass onto the nomadic device. The VCS may then send all or some of the requested off-board data 311 to the nomadic device. The VCS may utilize both an API and the communication link to send the data to the nomadic device. The data that is transferred from the VCS to the nomadic device may or may not be utilized with the contextual application running on the VCS. In a scenario when the VCS may not have the requested data, the VCS may send an error message indicating that the requested data could not be sent. In the scenario when another error has occurred in sending the requested data, the VCS may send different type of error messages or data to notify the nomadic device that its request could not be fulfilled.

Although exemplary processes and methods are shown herein, it is understood that these are for illustrative purposes only. One of ordinary skill would understand that the steps thereof could be performed in any suitable order to produce the desired results. Further, one of ordinary skill would understand that some and/or all of the steps could be replaced by similar processes that produce similar results and/or removed if not necessary to produce the desired results in accordance with the illustrative embodiments. For example, the nomadic devices may receive a request for off-board data 309 before it receives a request to receive on-board vehicle data 305. In another illustrative embodiment, the VCS may not send any relevant data 311 until it receives a request for both on-board and off-board data.

FIG. 4 depicts an illustrative flow chart of a nomadic device interacting with a vehicle based computing system. The nomadic device may connect 401 with a VCS through a wireless or wired communication link. In one illustrative example, both the nomadic device and VCS may utilize a Bluetooth wireless connection. The nomadic device may discover VCS and identify the device utilizing the Bluetooth protocol. The nomadic device may require a registration and pairing process that implements security features to prevent unauthorized devices from communicating with the nomadic device.

The nomadic device may then utilize a contextual based application which utilizes data generated outside of the nomadic device in order to dynamically change the applications environment. In one illustrative example, a user may launch a game on the nomadic device which is contextual-based. The application may then request vehicle data 403 by utilizing the connection with the VCS. The nomadic device may send a message with different bit assignments to communicate the specific data the nomadic device would like to utilize. Both the nomadic device and the VCS may utilize an API to facilitate communication between the devices. Other communication protocols may be utilized by the nomadic device and the VCS in order to communicate with messages.

The nomadic device may then constantly search for incoming data 405 to determine if the requested data arrived at the VCS. The VCS may send data to the nomadic device stating that the message requesting data was successfully sent by the nomadic device. In an alternative example, the nomadic device may receive an error message from the VCS indicating that an error occurred. The VCS may send a message indicating that the request transmission has failed and cause the nomadic device to again request the vehicle data 403. In another alternative example, the nomadic device may also receive data that it has requested or receive data that was not request. For example, the nomadic device may have requested data that was not available. The VCS may send a message indicating that the requested data is unavailable.

The nomadic device may then utilize the data 407 for use with a contextual-based application. The application may utilize the data directly to impact the effect on a display or visual aspect of the application or environment of the application. The application may also use the data to affect other events to occur on the nomadic device, such as operation of a video game application. For example, the nomadic device may receive off-board data indicating that the weather is rainy and on-board data that the windshield wipers are to dynamically change the environment of the application "WHEELS ON THE BUS." The application may identify the data and consequently utilize the data to potentially activate the application's school bus to turn on the wipers and to portray the school bus driving in rainy weather that is on portrayed on the display of the nomadic device.

Upon utilization of the data with the application, the nomadic device may then output the dynamic data 409. One illustrative example of outputting of the dynamic content is to produce dynamic content data on the display of the nomadic device. For example, the display of the nomadic device may output the application's school bus wipers turning on or off based on the vehicle's data. In another example, the nomadic device may utilize the received data to output sound through the nomadic devices speakers. In yet another illustrative example, the nomadic device may receive data from the VCS indicating that the horn of the vehicle has been activated. The nomadic device may then play a sound of the vehicle's horn utilizing the nomadic device's speakers.

The nomadic device may then utilize a contextual based application which utilizes data generated outside of the nomadic device in order to dynamically change the applications environment. In one illustrative example, a user may launch a game on the nomadic device which is contextual-based. The application running on the nomadic device may then request off-board 411 via the connection with the VCS. The nomadic device may send a message with different bit assignments to communicate the specific off-board data the nomadic device would like to utilize. Both the nomadic device and the VCS may utilize an API to facilitate communication between the devices. Other communication protocols may be utilized by the nomadic device and the VCS in order to communicate with data messages. In another illustrative embodiment, the nomadic device may communicate with off-board servers directly in order to request data. In yet another alternative embodiment, the nomadic device may simultaneously request both vehicle data and off-board data, eliminating the need to conduct both steps 403 and 411.

The nomadic device may then constantly search for incoming data 413 to determine if the requested data has arrived. The nomadic device may receive data that it requested or receive data that was not requested. In an alternative embodiment, the received data may be initiated by the VCS or remote server sending the data without a request for that specific type of data. In another illustrative instance, the nomadic device may request data that was not available on the off-board server. The VCS may send a message indicating that the requested data is unavailable. The nomadic device may receive off-board data and on-board data simultaneously or at different times. If no data is sent, the nomadic device may continue to request data until the VCS sends the data or a message indicating the reason no data was sent. A timeout may also be utilized after a certain period of time if the nomadic device never receives a response.

Upon utilization of the received message from the off-board data, the nomadic device may then utilize the contextual application to output the dynamic content 415. One example of outputting of the dynamic content is to display a visual graphic on the nomadic device. For example, the nomadic device may display an output image or video of the application's school bus having wipers turned on, based upon off-board data received from a weather server indicating that the weather is rainy. In another example, the nomadic device may utilize the received data to output sound through the nomadic devices speakers. In yet another illustrative example, the nomadic device may receive data from the VCS indicating that the horn of the vehicle has been activated. The nomadic device may then a play sound using the nomadic device's speakers.

Although exemplary processes and methods are shown herein, it is understood that these are for illustrative purposes only. One of ordinary skill would understand that the steps thereof could be performed in any suitable order to produce the desired results. Further, one of ordinary skill would understand that some and/or all of the steps could be replaced by similar processes that produce similar results and/or removed if not necessary to produce the desired results in accordance with the illustrative embodiments. For example, in on illustrative embodiment the nomadic device may only request vehicle data 403 and not request off-board data 413 or vice-versa.

FIG. 5 depicts an illustrative screen of an application outputting dynamic content through utilization of the environment data. Various types of graphics, games, applications, etc may be utilized on the nomadic device to utilize dynamic content. FIG. 5 only depicts an illustrative example of one of many applications that may be utilized on the nomadic device. The contextual application 500 may utilize both static and dynamic data in order to create a virtual environment on the nomadic device. Off-board data from a remote server and on-board data from the vehicle or nomadic device may be utilized to dynamically change the landscape of the applications environment. Application 500 is an example of an application utilizing both off-board data and on-board data to create a virtual environment.

A camera on the nomadic device or in the vehicle may be utilized to output a user's profile or image 503 utilizing data gathered from a camera on the nomadic device or vehicle. In one illustrative example, the nomadic device captures an image of a use's face to output an image 503 of a user in the virtual environment of the nomadic device. Multiple cameras and/or a combination of other sensors/modules may be utilized in order to create a dynamic output of a user or multiple users on the nomadic device. For example, occupant sensors may be utilized to determine the number of users to depict on the display of the nomadic device. In another example, a vehicle's key fob may be utilized to determine the user profile associated with the nomadic device. For example, a MYKEY key fob may indicate that a specific driver is associated with the vehicle and appropriate data may be sent to the nomadic device for use to output on the nomadic device. In yet another example, the VCS or nomadic device may communicate with a remote server to receive data from a detailed user profile of a nomadic device's user for output on the display of the nomadic device. The user profile data may come from a social network site.

In another example of utilizing dynamic content, the application of the nomadic device may utilize contextual data to indicate the location of a landmark, POI, or address. In one illustrative example, a vehicle may be driving near a famous landmark, such as the Statue of Liberty. The VCS may send a message indicating that the Statue of Liberty is in close proximity to the vehicle and nomadic device. Data detailing the landmark may be output as an image 505 on the nomadic device's display.

Another illustrative example of rendering done by the nomadic device utilizing contextual data, the device may utilize off-board weather data to display a dynamic weather environment 507. For example, if vehicle is located in a sunny weather, the VCS may communicate with an off-board server to receive weather data. The VCS may transmit the weather data to the nomadic device to display a sun 507, to indicate the weather. Other illustrative embodiments may include displaying clouds, rain, snow, sleet, hail, tornados, etc. In other illustrative embodiments, the weather data may not only impact the output on the display of the nomadic device, but it could change the controls of the environment.

In yet another illustrative embodiment, the nomadic device may utilize various location data to dynamically change content of the application. Some illustrative examples of location include, but are not limited to, GPS coordinates, point of interest data, latitude and longitude, city data, street data, house number data, etc. In one illustrative example, dynamic content 509 may indicate the street a vehicle is driving on. The VCS may utilize location data from a map database to send relevant data to the nomadic device. In one example, the nomadic device's application may display a street sign indicating the vehicle's current location. Other examples may include adjusting terrain on the application dependent on the terrain of the vehicle's current location.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A non-transitory computer readable storage media storing instructions that, when executed by a processor in a vehicle, causes the processor to:

connect a vehicle transceiver with a nomadic device configured to operate a contextual application;

collect environment data from at least one vehicle module, wherein the contextual application of the nomadic device is configured to use the environment data to output a graphical animation on a display of the nomadic device based on at least the environment data;

receive a request from the nomadic device for the environment data; and send the environment data to the nomadic device in response to the request.

2. The non-transitory computer readable storage media of claim 1, wherein the instructions further cause the processor to:

utilize an application program interface to process the request for environment data at the vehicle.

3. The non-transitory computer readable storage media of claim 1, wherein the environment data is off-board data.

4. The non-transitory computer readable storage media of claim 3, wherein the off-board data includes at least weather data, traffic data, user data, vehicle data, social media data, air quality data, or music data.

5. The non-transitory computer readable storage media of claim 1, wherein the request from the nomadic device includes an off-board data request and an on-board data request.

6. The non-transitory computer readable storage media of claim 1, wherein the environment data is on-board data.

7. The non-transitory computer readable storage media of claim 1, wherein connecting with the nomadic device is accomplished using a BLUETOOTH connection.

8. The non-transitory computer readable storage media of claim 1, wherein the environment data includes at least location-based data, speed data, map data, occupant data, image data, or music data.

9. The non-transitory computer readable storage media of claim 1, wherein connecting with the nomadic device is accomplished by a USB connection.

10. A vehicle computer system comprising:

a transceiver in a vehicle configured to wirelessly connect with a nomadic device, wherein the nomadic device is configured to operate a contextual application which operates at least in part based on vehicle environment data and outputs a graphical animation on a display of the nomadic device based at least in part on the vehicle environment data; and one or more vehicle modules configured to receive environment data and capable of causing the transceiver to provide the vehicle environment data to the nomadic device for processing by the contextual application.

11. The computer system of claim 10, wherein the environment data is data received from an off-board server.

12. The computer system of claim 10, wherein the environment data is data received from the vehicle computing system.

13. The computer system of claim 10, wherein the transceiver is configured to wirelessly connect via a BLUETOOTH connection.

14. The vehicle computer system of claim 10, where in the vehicle computer system further comprises one or more vehicle modules configured to receive user identification data and capable of causing the transceiver to provide the user identification data to the nomadic device for processing by the contextual application; and outputs the graphical animation on the display of the nomadic device based at least in part on the user identification data.

15. The vehicle computer system of claim 10, wherein the contextual application is a video-game.

16. The vehicle computer system of claim 10, wherein the contextual application utilizes the environment data to change an environment of the contextual application.

17. A method of providing a contextual application on a nomadic device, comprising:

connecting with a vehicle computer system(VCS) configured to collect environment data for utilization with the contextual application;

sending a request to the VCS to receive environment data;

receiving the environment data from the VCS; and outputting a dynamic graphical animation based on the environment data on a display of the nomadic device using the contextual application.

18. The method of claim 17, wherein the environment data that is received from the vehicle computer system includes off-board data.

19. The method of claim 17, wherein the contextual application is configured to allow interaction via a user interface.

20. The method of claim 17, wherein receiving the request is accomplished by utilizing an application program interface.

* * * * *